United States Patent
Sahota et al.

(10) Patent No.: US 6,683,275 B2
(45) Date of Patent: Jan. 27, 2004

(54) METHOD AND APPARATUS FOR FABRICATING PHASE-CHANGE RECORDING MEDIUM

(75) Inventors: Eiji Sahota, Kanagawa-ken (JP); Yasumi Horiguchi, Kanagawa-ken (JP); Gian Anton Zardini, Zuzwil (CH)

(73) Assignees: Memex Optical Media Solutions AG, Zuzwil (CH); Hitachi Computer Peripherals Co., Ltd., Kanagawa-ken (JP)

(*) Notice: Subject to any disclaimer, the term of this patent is extended or adjusted under 35 U.S.C. 154(b) by 33 days.

(21) Appl. No.: 09/798,036

(22) Filed: Mar. 5, 2001

(65) Prior Publication Data
US 2001/0054604 A1 Dec. 27, 2001

(30) Foreign Application Priority Data
Jun. 23, 2000 (JP) ......................... 2000-190087

(51) Int. Cl.⁷ ................. B23K 26/00; C23C 14/28; C23C 14/35
(52) U.S. Cl. ............... 219/121.65; 219/121.66
(58) Field of Search ............... 219/121.6, 121.65, 219/121.66, 121.76, 121.85, 121.86; 430/270.13; 204/192.2, 298.02

(56) References Cited

U.S. PATENT DOCUMENTS

| | | | |
|---|---|---|---|
| 4,975,355 A | 12/1990 | Suzuki | |
| 5,395,735 A | 3/1995 | Nagata et al. | |
| 5,661,800 A * | 8/1997 | Nakashima et al. | 380/4 |
| 5,683,515 A * | 11/1997 | Nakajima et al. | 118/715 |
| 5,965,323 A * | 10/1999 | Takahashi et al. | 430/270.13 |
| 6,143,468 A * | 11/2000 | Ohno et al. | 430/270.13 |
| 6,177,302 B1 * | 1/2001 | Yamazaki et al. | 438/158 |
| 6,187,150 B1 * | 2/2001 | Yoshimi et al. | 204/192.29 |
| 6,335,069 B1 * | 1/2002 | Ogawa et al. | 428/64.1 |

FOREIGN PATENT DOCUMENTS

| | | |
|---|---|---|
| JP | 61-020236 | 1/1986 |
| JP | 02-005246 | 1/1990 |
| JP | 03-076027 | 4/1991 |
| JP | 05-342629 | 12/1993 |
| JP | 06-012670 | 1/1994 |
| JP | 06-166268 | 6/1994 |
| JP | 07-272272 | 10/1995 |
| JP | 07-334845 | 12/1995 |
| JP | 09-161316 | 6/1997 |
| JP | 09-293247 | 11/1997 |
| JP | 10-112065 | 4/1998 |
| JP | 10-172145 | 6/1998 |
| JP | 10-198959 | 7/1998 |
| JP | 11-003522 | 1/1999 |
| WO | WO/ 00/31730 | 6/2000 |

OTHER PUBLICATIONS

European Search Report Dated Nov. 25, 2002.

* cited by examiner

Primary Examiner—Samuel M. Heinrich
(74) Attorney, Agent, or Firm—Nixon Peabody LLP; Jeffrey L. Costellia

(57) ABSTRACT

A method and apparatus for fabricating a phase-change recording medium for depositing particles of phase-change recording material onto a substrate to form a phase-change recording layer thereon. Here, a disk-like substrate is loaded into a vacuum chamber. The vacuum chamber is filled with sputtering gas, and then the substrate is rotate. Sputtering particles struck out of a sputtering target are deposited onto the substrate to form a phase-change recording layer. When the sputtering particles are deposited on the substrate up to a predetermined thickness, a crystallization energy supply mechanism irradiates the sputtering-particle-deposited substrate with a laser beam having energy necessary for initial crystallization. Alternatively, the crystallization energy supply mechanism irradiates a just-formed phase-change recording layer with a laser beam having energy necessary for initial crystallization.

27 Claims, 8 Drawing Sheets

METHOD AND APPARATUS FOR FABRICATING PHASE-CHANGE RECORDING MEDIUM

BACKGROUND OF THE INVENTION

1. Field of the Invention

The invention relates to a method and apparatus for fabricating a phase-change recording medium. In particular, the invention relates to a method and apparatus for fabricating a phase-change recording medium, capable of initial crystallization to the phase-change recording media.

2. Description of the Related Art

In recent phase-change recording media including such recording media as phase-change optical disks and optical memory cards, data record and reproduction are performed by utilizing the characteristic that when a phase-change recording layer formed on the substrate is irradiated with a laser beam, the irradiated portion of the phase-change recording layer varies in reflectivity depending on whether the portion is crystal or amorphous.

The recording layers of the phase-change recording media are formed by vacuum evaporation and sputtering technologies. The formed recording layers usually have a surface of low reflectivity, and tend to make the automatic focusing and tracking of a beam spot unstable. Accordingly, the phase-change recording media fabricated require initial crystallization over the entire recording layers in advance of users' use.

The initialization apparatus for performing the initial crystallization of a phase-change type optical disk according to the conventional art comprises: a high power semi-conductor laser; a collimating lens for polarizing a diffused light beam radiated from the semi-conductor laser into a parallel beam; and an objective lens for focussing the parallel beam output from the collimating lens into a light spot on the recording layer of the recording medium. Here, the light beam output from the high power semi-conductor laser is formed into the light spot through the collimating and objective lenses so that the light spot heats the recording layer up to a temperature in the range of its crystallizing and melting points for initial crystallization. This initial crystallization consumes approximately 20–60 seconds for each phase-change type optical disk.

In the above-described initial crystallization technology in the conventional art, phase-change type optical disks were fabricated before loaded into the initialization apparatus one by one, each consuming an initial crystallization time of approximately 20–60 seconds. This complicated the initial crystallization operation and made the processing time lengthy as well, ending up with a problem of increased costs of the phase-change type optical disks.

The documents describing the above-mentioned technology of applying initial crystallization to a phase-change type optical disk include Japanese Patent Laid-Open Publication No. Hei 5-342629, Japanese Patent Laid-Open Publication No. Hei 11-3522, Japanese Patent Laid-Open Publication No. Hei 10-198959, Japanese Patent Laid-Open Publication No. Hei 10-172145, Japanese Patent Laid-Open Publication No. Hei 09-293247, Japanese Patent Laid-Open Publication No. Hei 09-161316, Japanese Patent Laid-Open Publication No. Hei 07-334845, Japanese Patent Laid-Open Publication No. Hei 07-272272, and Japanese Patent Laid-Open Publication No. Hei 06-012670.

SUMMARY OF THE INVENTION

An object of the present invention is to provide a method and apparatus for fabricating a phase-change recording medium, which eliminate the need for initial crystallization operations by dedicated initialization apparatuses. Specifically, the present invention has the following objects:

A first object of the present invention is to provide a method and apparatus for fabricating a phase-change recording medium in which the fabrication and initial crystallization of a phase-change recording medium can be performed at the same time.

A second object of the present invention is to provide a method and apparatus for fabricating a phase-change recording medium in which the fabrication and initial crystallization of a phase-change recording medium can be performed, with the initial crystallization at high speed.

In addition to the second object, a third object of the present invention is to provide an easy-to-design method and apparatus for fabricating a phase-change recording medium.

To achieve the foregoing objects, the present invention provides a method for fabricating a phase-change recording medium for depositing particles of phase-change recording material onto a substrate to form a coat of phase-change recording layer, the method comprising: a first step of loading a substrate, especially a disk-like substrate into a vacuum chamber; a second step of filling the vacuum chamber with sputtering gas; an optional third step of rotating the substrate; a fourth step of depositing sputtering particles struck out of a sputtering target onto the substrate to form a phase-change recording layer; and a fifth step in which when the sputtering particles are deposited on the substrate up to a predetermined thickness in the fourth step, a crystallization energy supply mechanism irradiates the sputtering-particle-deposited substrate with a laser beam having energy necessary for initial crystallization. This makes it possible to perform the fabrication and initial crystallization of a phase-change recording medium at the same time. As the crystallization is made directly on the recording layer (without additional covering layers) and under vacuum, crystallization times and energy, may be reduced.

Moreover, the method for fabricating a phase-change recording medium according to the present invention may include a fifth step in which a crystallization energy supply mechanism irradiates the phase-change recording layer just formed in the fourth step with a laser beam having energy necessary for initial crystallization. This makes it possible to perform the fabrication and initial crystallization of a phase-change recording medium, with the initial crystallization at high speed.

Besides, an apparatus for fabricating a phase-change recording medium according to the present invention comprises: optionally a rotating mechanism for bearing and rotating a phase-change recording medium; a sputtering target made of a GeAsTe- or AgInAsTs-type alloy or the like; a cathode for striking sputtering particles of the GeAsTe- or AgInAsTs-type alloy or the like out of the sputtering target and depositing the sputtering particles struck out of the sputtering target onto a substrate to form a phase-change recording layer; and a crystallization energy supply mechanism for irradiating the sputtering-particle-deposited substrate with a laser beam having energy necessary for initial crystallization when the sputtering particles are deposited up to a predetermined thickness on the substrate. This makes it possible to perform the fabrication and initial crystallization of a phase-change recording medium at the same time.

The apparatus for fabricating a phase-change recording medium according to the present invention may also comprise a target fabrication chamber, an initial crystallization chamber, and a transporting mechanism. The target fabrication chamber includes a sputtering target and a cathode for depositing sputtering particles struck out of the sputtering target onto a substrate to form a phase-change recording layer. The initial crystallization chamber may include a rotating mechanism for bearing and rotating a phase-change recording medium, and a crystallization energy supply mechanism for irradiating the phase-change recording layer of a transported phase-change recording medium with a laser beam having energy necessary for initial crystallization. The transporting mechanism transports a phase-change recording medium having a just-formed phase-change recording layer, from the vacuum chamber to the initial crystallization chamber. The initial crystallization chambers is also put under vacuum. Transport between the target fabrication chamber and the crystallization chamber is also made under vacuum. This makes it possible to perform the fabrication and initial crystallization of a phase-change recording medium, with the initial crystallization at high speed. As the crystallization is made under vacuum and directly on the sputtered particles, crystallization energy may be reduced and crystallization times may be shortened.

Furthermore, in the apparatus for fabricating a phase-change recording medium according to the present invention, the crystallization energy supply mechanism may irradiate the recording layer with a single laser beam formed by an array of lasers extending in a radial direction of the phase-change recording medium, to apply the initial crystallization to the recording area of the recording layer. Alternatively, the crystallization energy supply mechanism may irradiate the recording layer with a plurality of laser beams to apply the initial crystallization to the recording area of the recording layer, the laser beams extending in radial directions of the phase-change recording medium and being separated from each other in the circumferential direction of the same. This allows a phase-change recording medium to be fabricated and subjected to initial crystallization. The use of on array of lasers or of a plurality of lasers also allows to shorten the crystallization time, because larger surface areas may be treated at the same time. If the width of the laser beam is as large as about half the diameter of a disk-like substrate, crystallization may be made within one revolution of the disc. It is, however, also possible to use one single laser beam which scans the surface of the disc.

The inventions is especially suitable for forming optical recording media such as compact discs or digital versatile discs. Such discs typically are formed as a plurality of layers. On a first dielectric layer there is arranged a protective layer followed by a recording layer. The recording layer is covered with an optional interface or protection layer, followed by a second dialectricum and an optical reflecting layer formed of metal material. The recording layer is amorphous when formed and is crystallized according to the present invention.

Instead of an optical disc having one single recording layer discs with a plurality of recording layers may be formed according to the present invention. In such a case, the above mentioned layer construction is repeated a number of times. Instead of an optical reflecting layer, partially reflecting layers are used in such a case. The present invention allows to crystallize each recording layer separately, before subsequent layers are formed. The present invention therefore allows to crystallize each recording layer in a precise and defined manner. The energy for crystallization and the time necessary for crystallization can be reduced therewith.

The method and the apparatus according to the present invention may also be used for producing other recording media than optical discs, such as hard-discs, where thin film layers have to be initialized by means of energy supply mechanisms in the form of lasers. The invention may also be used in the field of nano-technology.

It is also conceivable to directly irradiate sputtering particles struck out of the sputtering target so that the particles themselves are provided with energy necessary for initial crystallization.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, a first embodiment of the method and apparatus for fabricating a phase-change recording medium according to the present invention will be described with reference to the drawings.

Description of First Embodiment

Figure 1:
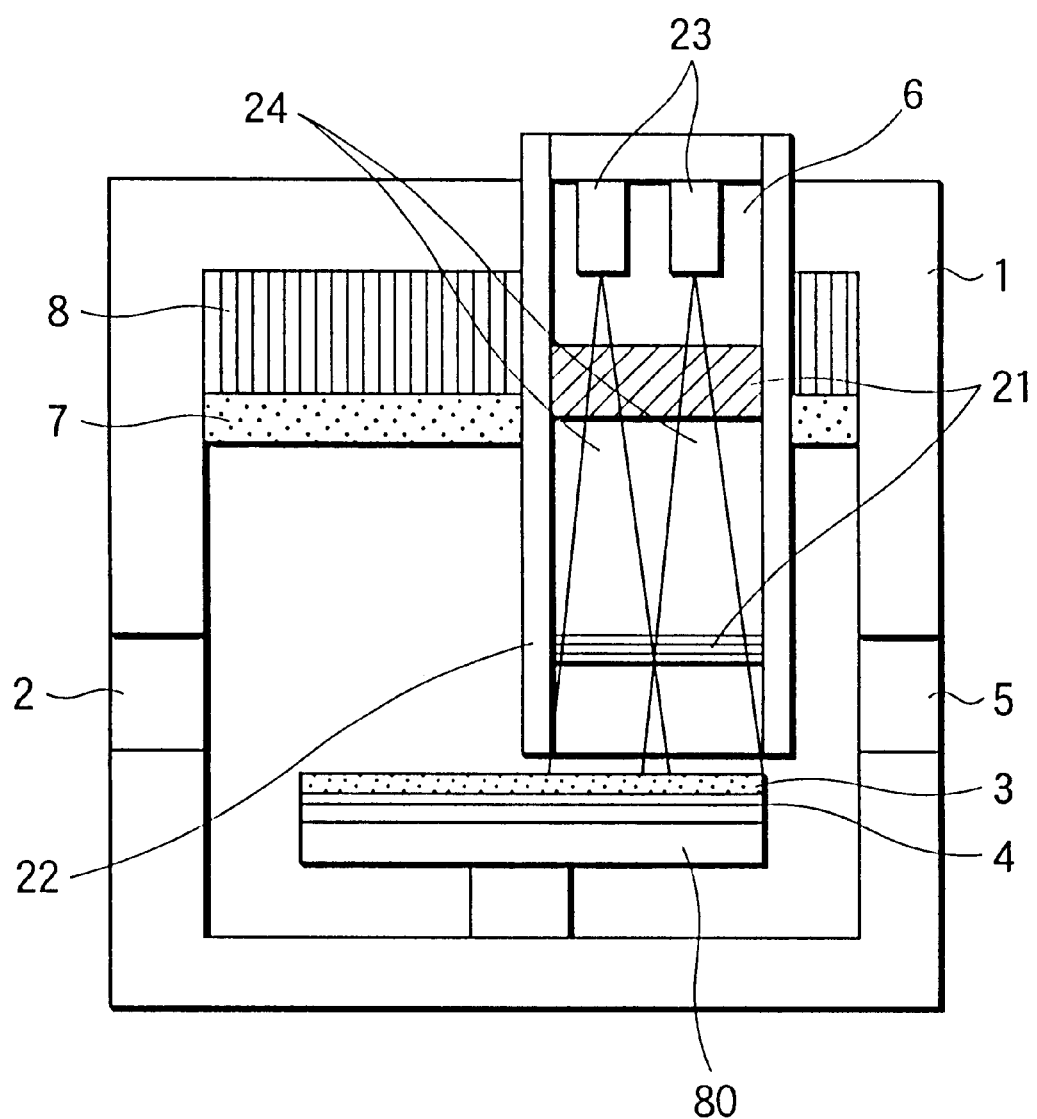
FIG. 1 is a cross-sectional view showing a fabrication apparatus to which the method for fabricating a phase-change optical disk according to a first embodiment of the present invention is applied.

FIG. 1 is a diagram showing the general configuration of a fabrication apparatus which practices the method for fabricating a phase-change recording medium according to the first embodiment. This fabrication apparatus fabricates a phase-change recording medium of disk form (phase-change optical disk). This apparatus comprises a vacuum chamber 1, a gas inlet 2, a gas outlet 5, a sputtering target 7, a cathode 8, a crystallization energy supply mechanism 6, and a rotating mechanism 80. The vacuum chamber 1 is filled with sputtering gas composed chiefly of Ar gas, at a pressure not higher than approximately 120 mTorr. The sputtering gas is filled into the vacuum chamber 1 through the gas inlet 2, and discharged therefrom through the gas outlet 5. A disk-like substrate 4 is to be coated with a phase-change recording layer 3. The cathode 8 ionizes and applies the sputtering gas to the sputtering target 7 which is made of a GeAsTe- or AgInAsTs-type alloy or the like. The crystallization energy supply mechanism 6 applies laser beams to the phase-change recording layer during or immediately after the on-substrate deposition of GeAsTe- or AgInAsTs-type sputtering particles 20 struck out of the sputtering target 7, so as to supply deposited layer with energy necessary for initial crystallization. The rotating mechanism 80 rotates the substrate 4. Besides, as shown in FIG. 2, the sputtering target 7 is provided with a radially-extending rectangular hole 30.

Figure 3:
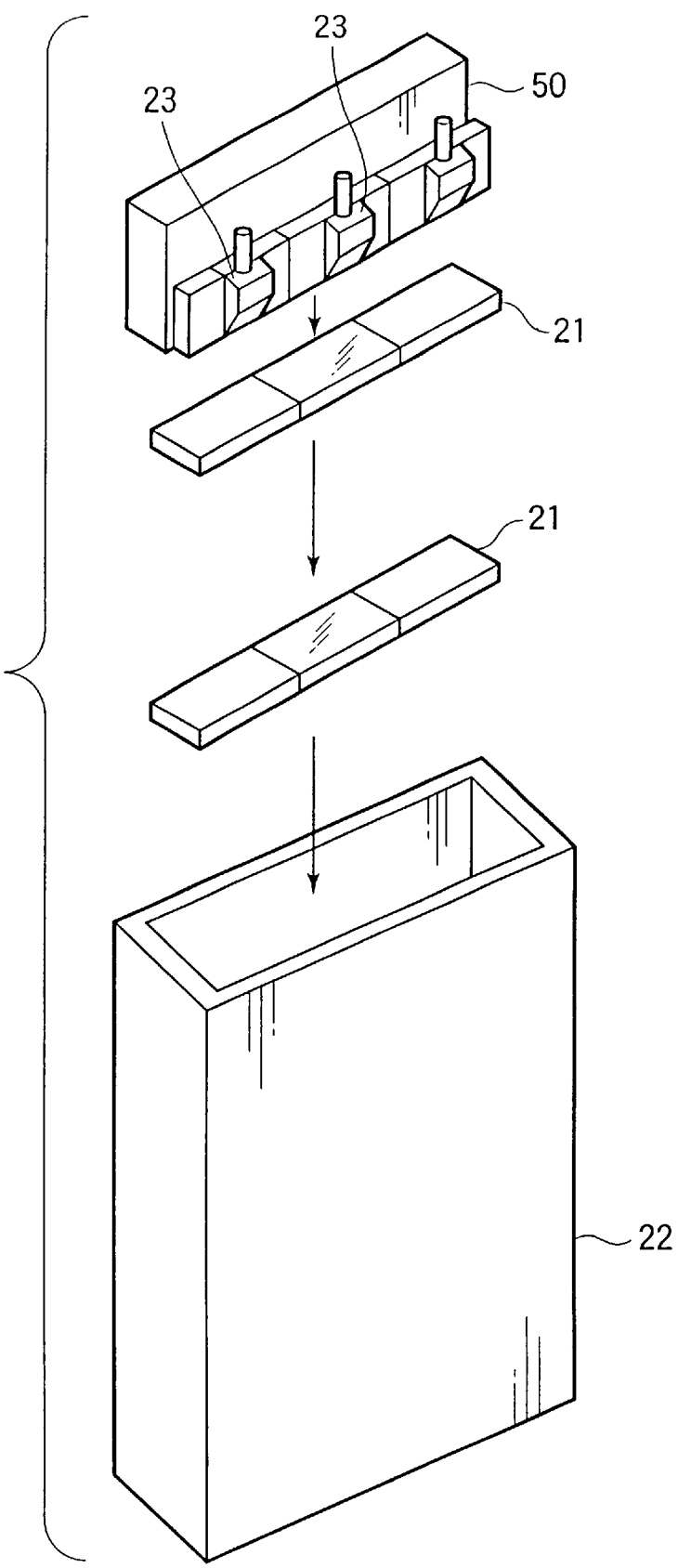
FIG. 3 is a disassembled perspective view of a crystallization energy supply mechanism in the fabrication apparatus of the first embodiment.

FIG. 3 shows an exploded view of the crystallization energy supply mechanism 6. This crystallization energy supply mechanism 6 is composed of a semi-conductor laser 50, two optical parts 21 (of glass), and a skirt portion 22 of rectangular tubular form. A plurality of semi-conductor laser devices 23 are arranged on the semi-conductor laser 50. The two optical parts 21 focus the laser beams radiated from the semi-conductor laser 50 into predetermined directions. The skirt portion 22 integrally accommodates the semi-conductor laser 50 and the optical part 21.

Figure 4:
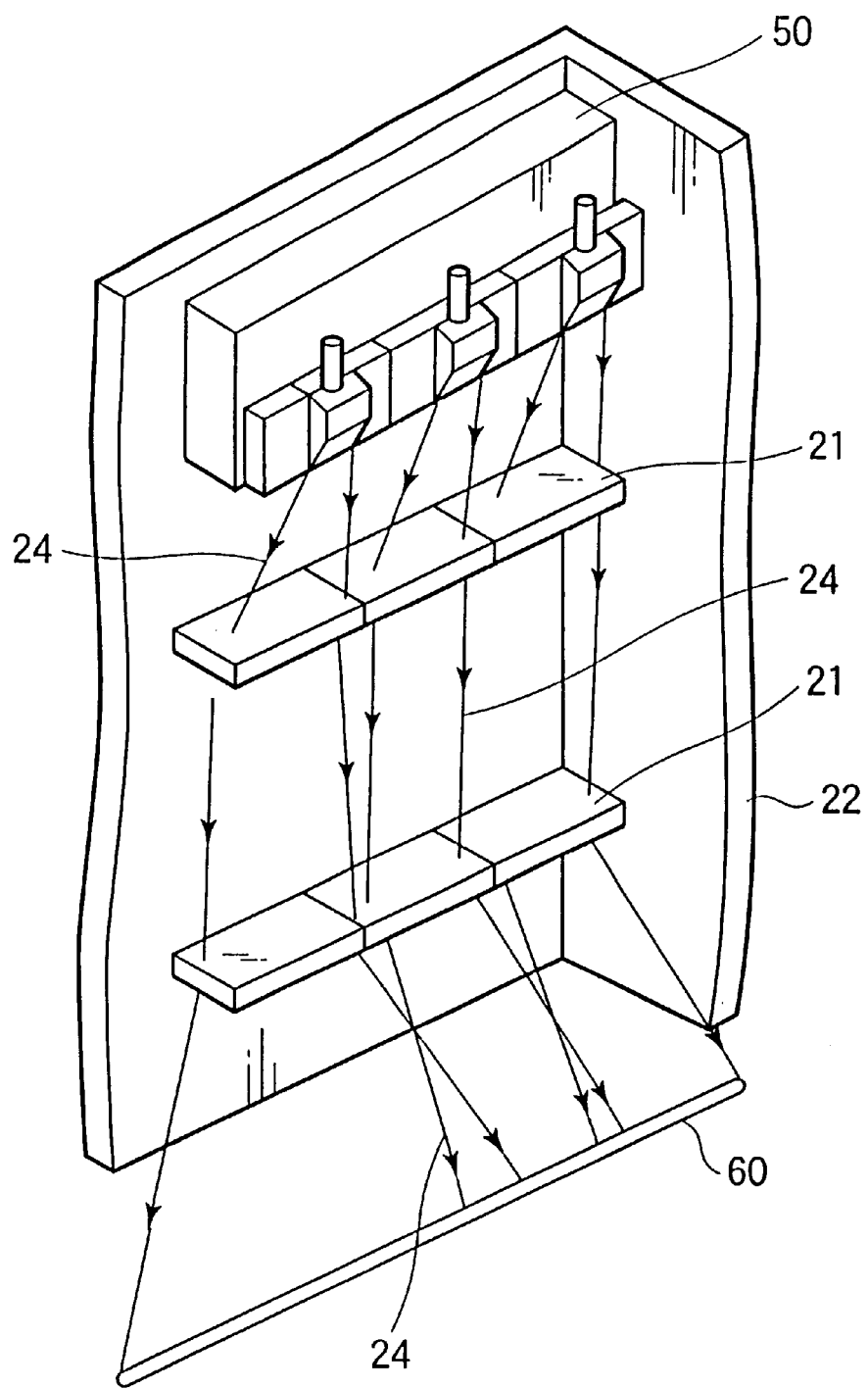
FIG. 4 is a diagram explaining the operation of the crystallization energy supply mechanism in the fabrication apparatus of the first embodiment.

This crystallization energy supply mechanism 6, as shown partly sectioned in FIG. 4, condenses a focused, single laser beam 60 onto the substrate by the plurality of optical parts 21 focussing laser beams 24 radiated from the semi-conductor laser 50 into their respective predetermined directions within the rectangular tubular skirt portion 22.

Figure 2:
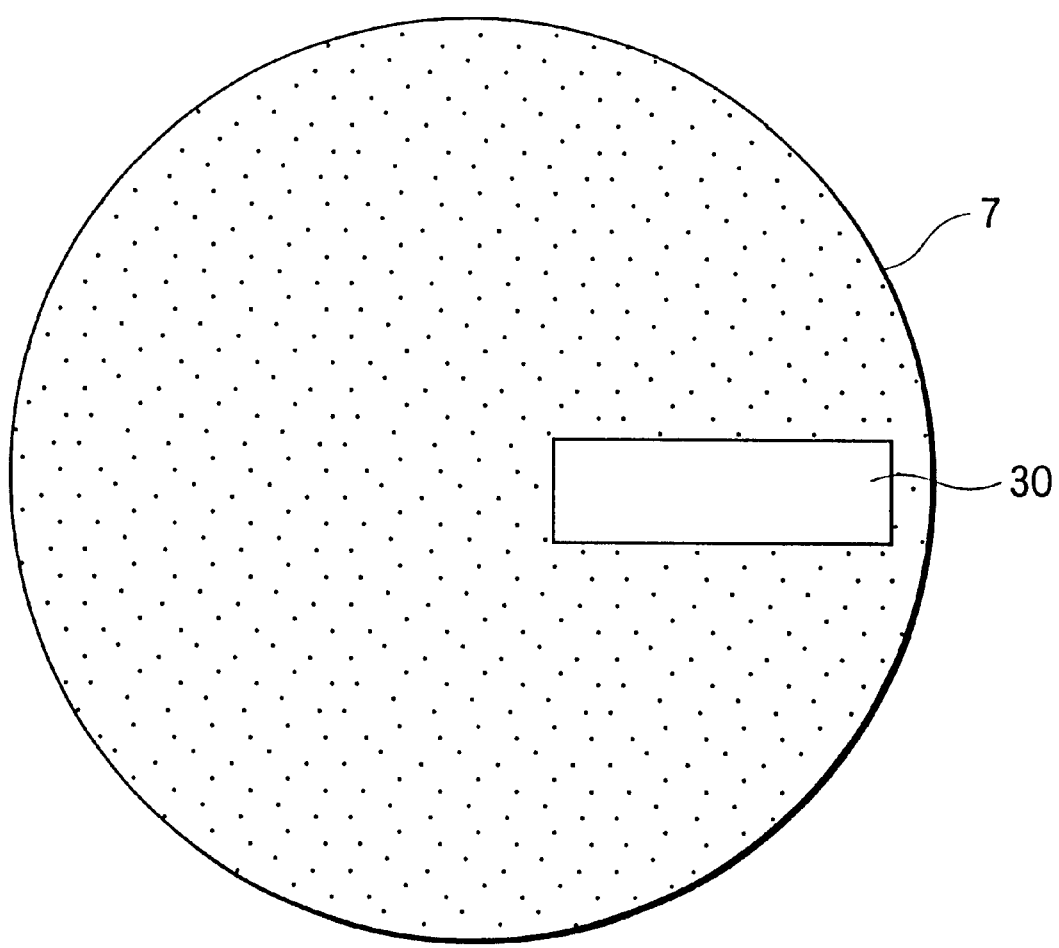
FIG. 2 is a diagram showing the configuration of a sputtering target in the fabrication apparatus of the first embodiment.

In the fabrication apparatus shown in FIG. 1, this crystallization energy supply mechanism 6 is placed with its upper end through the hole 30 of the sputtering target 7 shown in FIG. 2 and a rectangular hole (not shown) made in the cathode 8, and with the lower end of the skirt portion 22 near above the substrate 4.

In the mechanism 6, the plurality of optical parts 21 in the lower part of the skirt portion 22 provides spatial isolation between the interior and exterior of the skirt portion 22 to maintain the vacuum chamber 1 in a vacuum. Moreover, the lower end of the skirt portion 22 extends to immediately above the substrate 4 to prevent sputtering articles from adhering to the plurality of optical parts 21. Incidentally, the holes in the sputtering target 7 and the cathode 8 are made in accordance with the outside shape of the crystallization energy supply mechanism. The holes may have a configuration with rounded acute portions or the shape of a prolate ellipse so as to avoid the generation of abnormal arcs in sputtering. Moreover, the sputtering target 7 preferably has a diameter of the order of 200 mm, which is as large as that of ordinary target materials, and a thickness of the order of 5–10 mm.

In the apparatus for fabricating a phase-change recording medium configured thus, the vacuum chamber 1 is filled with the sputtering gas composed chiefly of Ar gas. With a DC voltage across the sputtering target 7 and the substrate 4, the cathode 8 applies the Ar gas to the sputtering target 7. This strikes sputtering particles 20 (atoms) out of the GeAsTe- or AgInAsTs-type recording layer material constituting the sputtering target 7, or a recording layer of a metal alloy having the equivalent properties. Due to the voltage application, these sputtering particles 20 are deposited as the recording layer 3 on the surface of the rotating substrate 4.

In this apparatus, when the deposit thickness reaches or exceeds 5 nm, the crystallization energy supply mechanism 6 irradiates the recording layer 3 just deposited on the substrate 4 with laser beams having the energy necessary for initial crystallization. The reason why the crystallization energy supply mechanism 6 starts the initial crystallization at the time when the deposit thickness reaches or exceeds 5 nm is that the initial crystallization at below 5 nm is low in efficiency and that the laser beam irradiation can possibly cause an exfoliation of the recording layer deposited. However, the present invention is not limited to deposit thicknesses greater than or equal to 5 nm. Incidentally, whether the deposit thickness reaches/exceeds 5 nm can be detected by an optical detection mechanism. Alternatively, a timer may be used to start the initial crystallization in a predetermined time to reach/exceed 5 nm in accordance with the sputtering conditions.

The time required for the deposition of the phase-change recording layer 3 is approximately 2–6 seconds, and the present embodiment performs the initial crystallization within the deposition time. This initial crystallization may be conducted immediately after the deposition of the phase-change recording layer.

As described above, in the method and apparatus for fabricating a phase-change recording medium according to the present embodiment, the crystallization energy supply mechanism 6 irradiates the recording layer 3 being deposited on the substrate 4 with the laser beams having the energy necessary for initial crystallization. This makes it possible to perform the initial crystallization of a phase-change recording medium (phase-change optical disk) during the fabrication process time of the medium, thereby eliminating the need for initial crystallization operations by special initialization apparatuses.

Description of Second Embodiment

The above-described embodiment has dealt with the case where the energy supply mechanism 6 irradiates the recording layer 3 being deposited on the substrate 4 with the laser beam 60 having the energy necessary for initial crystallization so that the initial crystallization is conducted during the fabrication of the phase-change recording medium.

Nevertheless, the present invention is not limited to the course of deposition, and is also applicable in the cases where the initial crystallization of the phase-change recording medium through the laser beam irradiation is performed immediately, i. e. within a period of time of 30 seconds after the deposition. This period may be preferably within 10 seconds so as not for the temperature of the substrate to decrease after the deposition.

In a method and apparatus for fabricating a phase-change recording medium according to this second embodiment, an initial crystallization chamber within may be vacuumized(to be described later) for performing initial crystallization is provided separate form the fabrication chamber for depositing the above-mentioned sputtering particles on a substrate to fabricate a phase-change recording medium. There is also provided a vacuumized transport mechanism for transporting a phase-change recording medium just fabricated in the fabrication chamber to the initial crystallization chamber.

The fabrication chamber mentioned above is the fabrication apparatus of FIG. 1 minus the energy supply mechanism 6. The initial crystallization chamber consists of a rotating mechanism and the energy supply mechanism 6 arranged above the same.

This method and apparatus for fabricating a phase-change recording medium transport a just-fabricated phase-change recording medium to the initial crystallization chamber for initial crystallization. Accordingly, when the number of revolutions of a disk under sputtering differs from that on the initial crystallization condition, the fabrication method and apparatus of the present embodiment allow the numbers of revolutions to be set individually, by virtue of the provision of the separate chambers.

Figure 7:
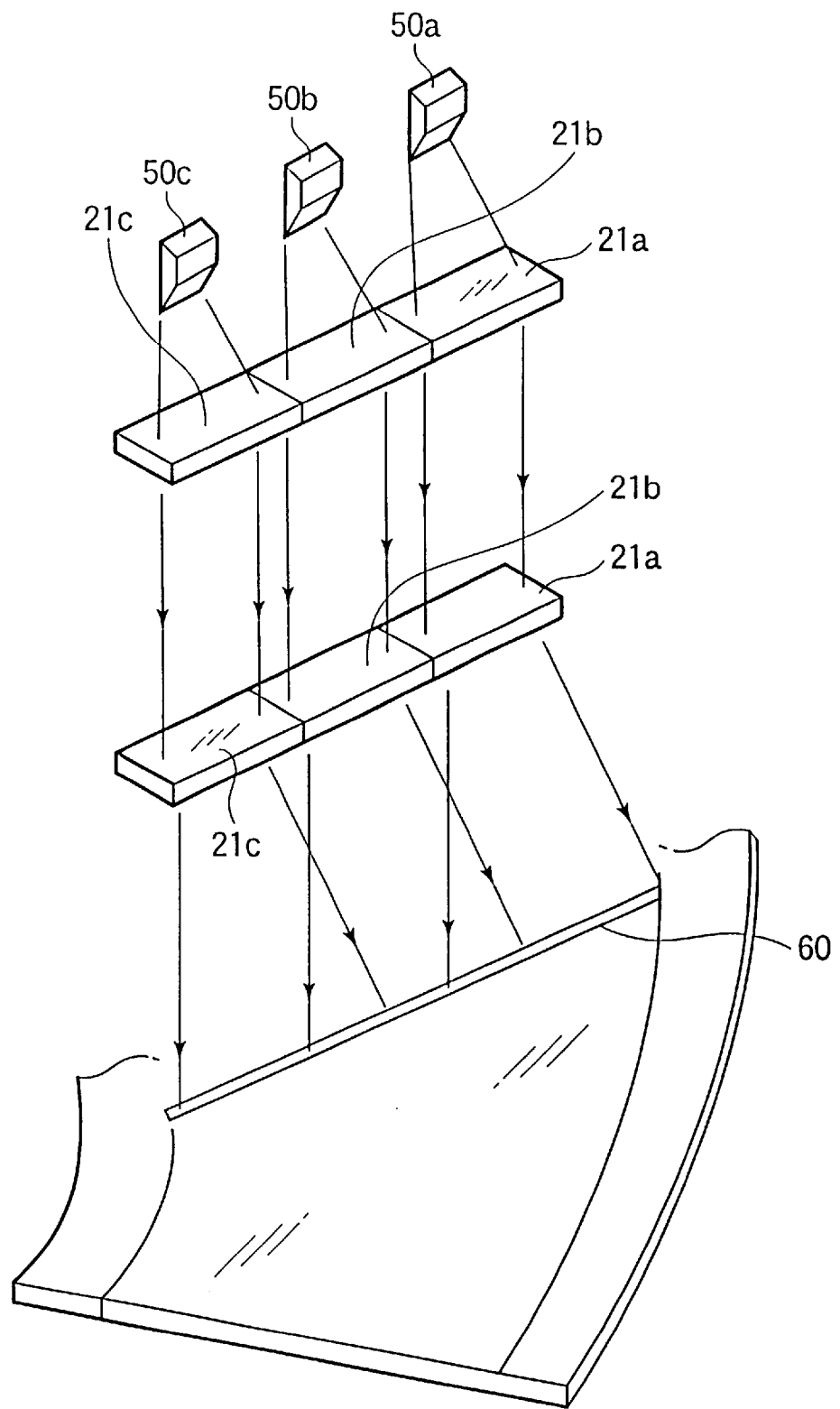
FIG. 7 is a diagram explaining the principle of a fabrication apparatus to which the method for fabricating a phase-change recording medium according to a third embodiment of the present invention is applied.
Figure 8:
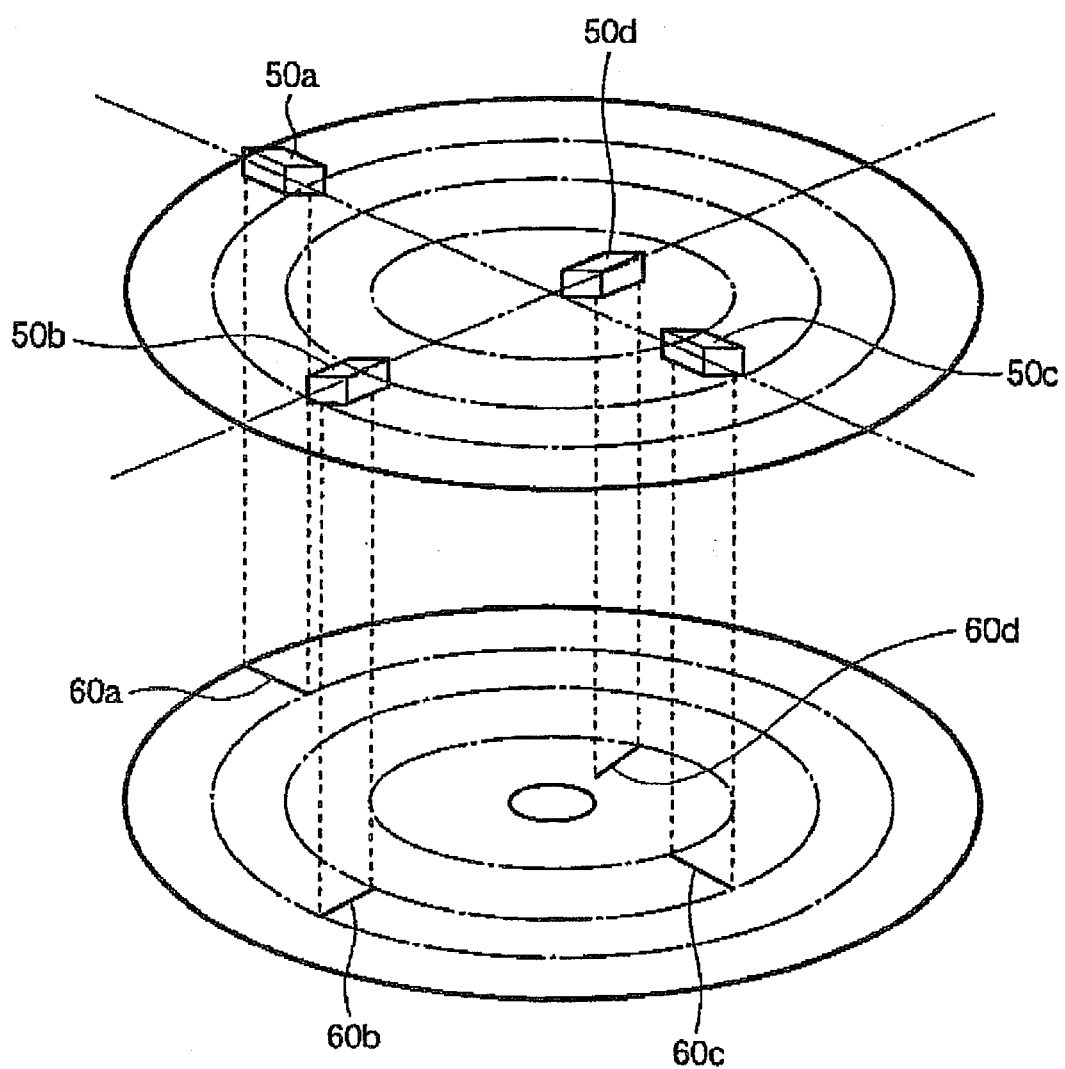
FIG. 8 is a diagram explaining the principle of a fabrication apparatus to which the method for fabricating a phase-change recording medium according to a fourth embodiment of the present invention is applied.

The energy supply mechanism 6 according to the present invention is not limited to the one shown in FIG. 3, and may have the configurations shown in FIGS. 7 and 8.

Description of Third Embodiment

FIG. 7 is a diagram showing another example of the energy supply mechanism for use in a method and apparatus for fabricating a phase-change recording medium, provided with the above-mentioned initial crystallization chamber.

This energy supply mechanism is composed of: a semi-conductor laser group having a plurality of semi-conductor laser devices 50a–50c in a row; two optical parts (of glass) for focussing the laser beams radiated from the semi-conductor laser group into predetermined directions; and a skirt portion (not shown) of rectangular tubular form, for integrally accommodating the semi-conductor laser group and the optical parts.

The semi-conductor laser group comprises the semi-conductor laser devices 50a–50c for initial crystallization.

The two optical parts (of glass) mentioned above comprise glasses 21a–21c. The glasses 21a–21c focus the laser beams radiated from the semi-conductor laser devices 50a–50c into respective predetermined directions and perform focusing, hereby forming a single laser beam 60.

In the method and apparatus for fabricating a phase-change recording medium according to this third embodiment, a just-fabricated phase-change recording medium is transported to the initial crystallization chamber. The energy supply mechanism of the initial crystallization chamber, as shown in FIG. 7, irradiates the surface of the recording layer on the phase-change recording medium, which is high in temperature and not yet crystallized, with the laser beam 60 for initial crystallization while rotating the phase-change recording medium. Thereby, the initial crystallization can be performed.

Experiments showed that a reflectivity of 29.4% was obtained from a phase-change optical disk that was initial crystallized by using the fabrication apparatus described in the above-described embodiment, under the condition that the number of revolutions of the optical disk was 35 rpm and the total laser beam output was 200 W. This value is close to a reflectivity of 29.7% which was obtained from a phase-change optical disk subjected to an initial crystallization operation by using a conventional initialization apparatus with the following initial crystallization parameters: 2 watts of beam output; an initial crystallization width of 200 im; an initial crystallization linear velocity of 3 m/sec; and a feed pitch of laser beam of 96 im for each disk revolution. On the other hand, the time consumed for the initial crystallization was approximately 31 seconds in the conventional initialization apparatus, whereas it was approximately 1.72 seconds in the apparatus of the present embodiment.

Thus, the method and apparatus for fabricating a phase-change recording medium according to the third embodiment can perform the initial crystallization of a recording medium in a short time.

Description of Fourth Embodiment

The energy supply mechanism 6 described above may have the configuration shown in FIG. 8. FIG. 8 is a diagram explaining the principle of the energy supply mechanism in the method and apparatus for fabricating a phase-change recording medium according to a fourth embodiment.

The energy supply mechanism according to the present embodiment comprises a plurality of semi-conductor laser devices 50a–50d separately arranged on the top face of the initial crystallization chamber mentioned above. The semi-conductor laser device 50a irradiates the outer area of a recording medium with a laser beam 60a for initial crystallization. The semi-conductor laser device 50d irradiates an inner area of the recording medium with a laser beam 60d for initial crystallization. The semi-conductor laser devices 50b and 50c irradiate the area between the outer and inner areas of the recording medium with laser beams 60b and 60c for initial crystallization. Thereby these laser beams 60a–60d apply the initial crystallization to the recording medium.

That is, according to the fabrication method and apparatus of this embodiment, the energy supply mechanism in the initial crystallization chamber has a plurality of semi-conductor laser devices 50a–50d that are radially and circumferentially spaced from a disk-like recording medium. The semi-conductor laser devices 50a–50d perform the initial crystallization of the recording medium.

As described above, in the method and apparatus for fabricating a phase-change recording medium according to the fourth embodiment, a just-fabricated phase-change recording medium is transported to the initial crystallization chamber. The energy supply mechanism of the initial crystallization chamber, as shown in FIG. 8, irradiates the surface of the recording layer on the phase-change recording medium, which is high in temperature and not yet crystallied, with the laser beams 60a–60d for initial crystallization, while the phase-change recording medium is rotated. This makes it possible to perform the initial crystallization. In particular, the apparatus according to the present embodiment has the semi-conductor laser devices which can be spaced from each other, and thus is easier to design as compared with the apparatus of the foregoing embodiment. Besides, when the number of revolutions of a disk under sputtering differs from that on the initial crystallization condition, the fabrication method and apparatus of the present embodiment allow the numbers of revolutions to be set individually, by virtue of the provision of the separate chambers. Note that FIG. 8 is a diagram for explaining the principle, and thus the optical parts (of glass) for polarizing laser beams and other parts are omitted from the diagram.

This method and apparatus for fabricating a phase-change recording medium transport a just-fabricated phase-change recording medium into the initial crystallization chamber for initial crystallization. Therefore, in the fabrication method and apparatus of the present embodiment, the phase-change recording layer on the phase-change recording medium is high in temperature and not yet crystallized, being just fabricated. This allows the initial crystallization to be performed at low power in a short time.

Description of Fifth Embodiment

Figure 5:
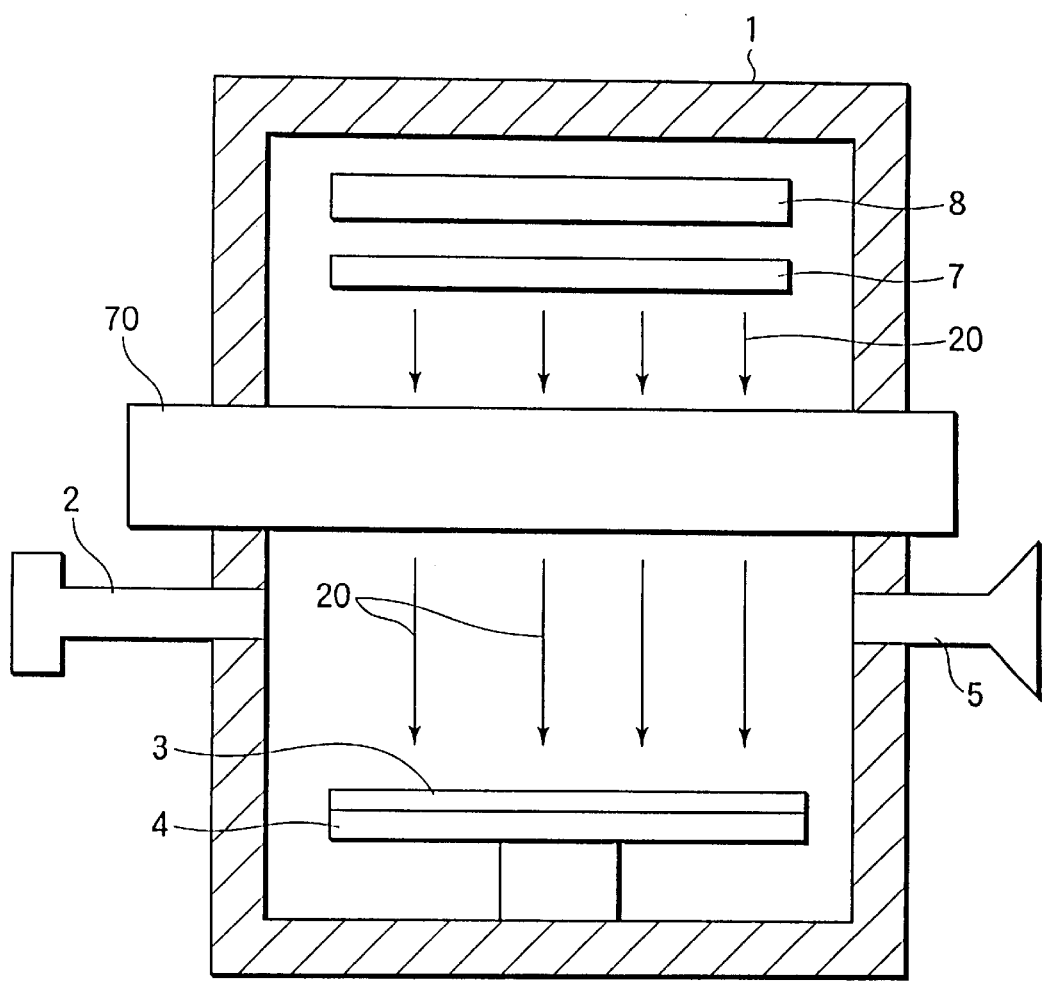
FIG. 5 is a cross-sectional view showing a fabrication apparatus to which the method for fabricating a phase-change recording medium according to a second embodiment of the present invention is applied.
Figure 6:
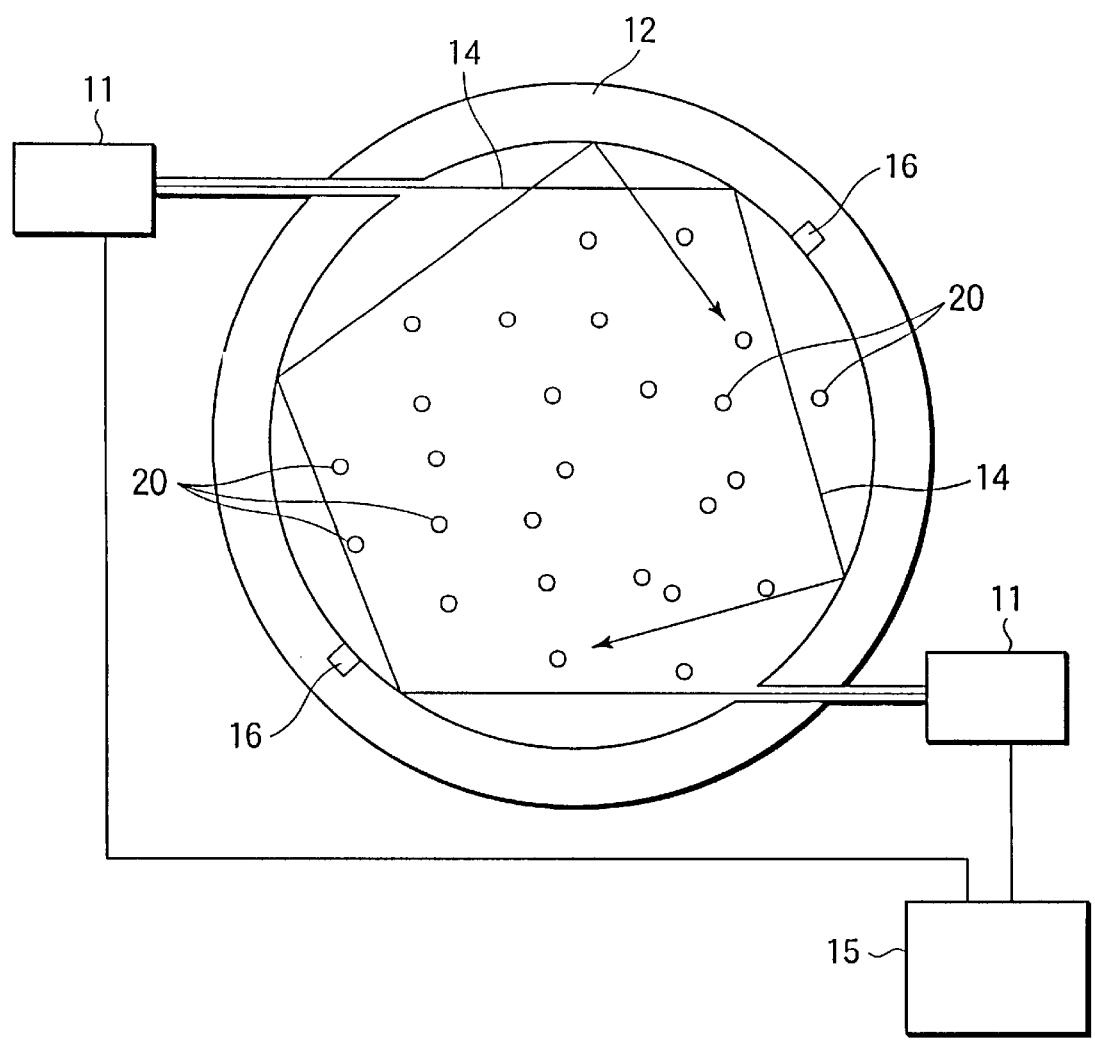
FIG. 6 is a diagram explaining the operation of a crystallization energy supply mechanism in the fabrication apparatus shown in FIG. 5.

Now, description will be given of an embodiment in which an energy supply mechanism applies initial crystallization to sputtering particles in sputtering. FIGS. 5 and 6 are diagrams explaining the method and apparatus for fabricating a phase-change recording medium according to the fifth embodiment. FIG. 5 is a longitudinal sectional view of the fabrication apparatus, and FIG. 6 a cross-sectional view of the same.

The apparatus for fabricating a phase-change recording medium (phase-change optical disk) shown in FIG. 5 comprises a vacuum chamber 1, a gas inlet 2, a gas outlet 5, a sputtering target 7, a cathode 8, and a crystallization energy supply mechanism 70. The vacuum chamber 1 is filled with Ar gas (sputtering gas) at a pressure not higher than approximately 120 mTorr. The Ar gas is filled into the vacuum chamber 1 through the gas inlet 2, and discharged therefrom through the gas outlet 5. A disk-like substrate 4 is to be coated with a phase-change recording layer 3. The sputtering target 7 is made of a GeAsTe- or AgInAsTs-type alloy or the like. The cathode 8 ionizes and applies the sputtering gas onto the sputtering target 7. The crystallization energy supply mechanism 70 irradiates sputtering particles 20 of a GeAsTe- or AgInAsTs-type alloy or the like, struck out of the sputtering target 7 with laser beams to be described later so that the sputtering particles 20 themselves are provided with energy necessary for initial crystallization. With the Ar gas (sputtering gas) filled into the vacuum chamber 1, and with a DC or AC voltage applied between the sputtering target 7 and the substrate 4, the cathode 8 applies the Ar gas to the sputtering target 7 to strike out the sputtering particles 20 (atoms) of the GeAsTe- or AgInAsTs-type alloy constituting the sputtering target 7. Due to the voltage application, the sputtering particles 20 are deposited as the recording layer 3 on the substrate 4.

In particular, the fabrication apparatus according to the present embodiment comprises the crystallization energy supply mechanism 70 for irradiating the sputtering particles 20 that are on the way from the sputtering target 7 to the substrate 4, with the laser beams that have as much energy as crystallize the sputtering particles 20.

As shown in the cross-sectional view in FIG. 6, this crystallization energy supply mechanism 70 comprises a reflecting ring 12, a pair of laser sources 11, a pair of sensors 16, and a laser source controlling unit 15. The reflecting ring 12 has a cylindrical shape, with an inner surface mirror-finished at a reflectivity not lower than 99%. The pair of laser sources 11 radiate laser beams into the reflecting ring 12 from symmetrical positions on the ring. The pair of sensors 16 measure the laser beams inside the ring for light intensity. The laser source controlling unit 15 adjusts the laser beams to be radiated from the laser sources 11 in accordance with the light intensities from the sensors 16.

To avoid the sputtering particles 20 adhering thereto with a drop in reflectivity, the inner surface of the reflecting ring 12 is subjected to a surface treatment that prevents particles of a GeAsTe- or AgInAsTs-type alloy or the like from adhering to the surface. The reason that the laser beams are diffused within a plane perpendicular to the passing direction of the sputtering particles is to prevent the laser beams from diffusing in vertical directions to drop in energy, as well as from coming to strike on the substrate 4, the target 7, or the like with a temperature rise.

In the crystallization energy supply mechanism 70 configured thus, the reflecting ring 12 reflects the laser beams radiated from the laser sources 11 with its inner surface repetitively to distribute the laser beams over the plane (the plane perpendicular to the passing direction of the sputtering particles). The crystallization energy supply mechanism 70 thereby irradiates the sputtering particles 20 passing through the mechanism 70 with the laser beams so that these sputtering particles 20 passing are provided with as much energy as cause initial crystallization.

Consequently, the apparatus for fabricating a phase-change recording medium (optical disk) according to the present embodiment can coat the substrate 4 with the phase-change recording layer 3 and perform the initial crystallization of the phase-change material constituting the recording layer 3 at the same time. It follows that the need for the initial crystallization operations after disk fabrication can be eliminated to prevent process complication and save the initial crystallization time, avoiding a rise in the cost of the phase-change type optical disk.

The above-described embodiment has dealt with the case where the reflecting ring 12 in the crystallization energy supply mechanism 70 has the shape of a perfect circle. Nevertheless, the reflecting ring according to the present invention may have even an oval shape or a polygonal shape as long as the laser beams therein are repetitively reflected by the inner surface and diffused over the plane (the plane perpendicular to the passing direction of the sputtering particles). The above-described embodiment has also dealt with the case of fixing the laser sources 11, whereas a laser beam, for example, may be swept across arbitrary directions so as to prevent the beam irradiation from concentrating on a single position.

Moreover, the foregoing embodiments have been described with phase-change recording media (phase-change optical disks) having a phase-change recording layer alone as examples. However, the present invention is not limited to optical disks. Phase-change recording media of other configurations, such as card-type configurations, are also applicable. Besides, as described in the above-mentioned publications, the laser beam irradiation stated above may be performed in forming a crystallization accelerating layer which comes into contact with the recording layer for accelerating crystallization.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method for fabricating a phase-change recording medium for depositing particles of phase-change recording material onto a substrate to form a coat of phase-change recording layer, the method comprising:

a first step of loading a substrate into a vacuum chamber;

a second step of filling said vacuum chamber with a sputtering gas;

an optional third step of rotating the substrate;

a fourth step of depositing sputtering particles struck out of a sputtering target onto the substrate to form a phase-change recording layer, the sputtering particles being deposited on the substrate up to a pre-determined thickness; and a fifth step in which a crystallization energy supply mechanism irradiates the sputtering particles with a laser beam having energy necessary for initial crystallization, wherein initialization of the irradiation is started during the course of the fourth step of deposition, but does not begin until the coat of the phase-change recording layer reaches the pre-determined thickness.

2. The method according to claim 1, wherein the sputtering particles struck out of the target are directly irradiated so that the particles themselves are provided with energy necessary for initial crystallization.

3. The method for fabricating a phase-change recording medium according to claim 1, wherein:
in said second step, said vacuum chamber is filled with sputtering gas composed chiefly of Ar gas at a pressure not greater than approximately 120 mTorr;
in said fourth step, the phase-change recording layer is formed of a GeAsTe-, AgInAsTs-, or other type of recording layer material, or a metal alloy having properties equivalent to those of the recording layer material; and
the predetermined thickness in said fifth step is greater than or equal to 5 nm.

4. A method according to claim 1, wherein in the fifth step a crystallization energy supply mechanism irradiates the phase-change recording layer just formed in said fourth step with a laser beam having energy necessary for initial crystallization.

5. The method for fabricating a phase-change recording medium according to claim 4, wherein said fifth step includes:
a sixth step of transporting the phase-change recording medium having the phase-change recording layer just formed thereon in said fourth step to an initial crystallization chamber under vacuum; and
a seventh step in which said crystallization energy supply mechanism irradiates the recording layer with the laser beam having energy necessary for initial crystallization.

6. The method for fabricating a phase-change recording medium according to claim 5, wherein said seventh step includes:
an eighth step in which said crystallization energy supply mechanism irradiates the recording layer with a single laser beam extending in a radial direction of the phase-change recording medium, to apply the initial crystallization to the recording area of the recording layer.

7. The method for fabricating a phase-change recording medium according to claim 5, wherein said seventh step includes:
a ninth step in which said crystallization energy supply mechanism irradiates the recording layer with a plurality of laser beams to apply the initial crystallization to the recording area of the recording layer, the laser beams extending in radial directions of the phase-change recording medium and being separated from each other in the circumferential direction of the same.

8. An apparatus for fabricating a phase-change recording medium for depositing particles of phase-change recording material onto a substrate within a vacuum chamber filled with a sputtering gas so as to form a coat of phase-change recording layer, comprising:
a sputtering target made of a GeAsTe- or AgInAsTs-type alloy or the like;
a cathode for striking sputtering particles of the GeAsTe- or AgInAsTs-type alloy or the like out of said sputtering target and depositing the sputtering particles struck out of said sputtering target onto a substrate to form a phase-change recording layer; and
an initial crystallization chamber which may be put under vacuum, said initial crystallization chamber including a crystallization energy supply mechanism for irradiating the sputtering particles with a laser beam having energy necessary for initial crystallization of the sputtering particles, and a transporting mechanism for transporting the phase-change recording medium having a just-formed phase-change recording layer at elevated temperature after deposition of the sputtering particles from said vacuum chamber to said initial crystallization chamber, wherein initialization of irradiation occurs after the phase-change recording medium having the just-formed phase-change recording layer is transported at elevated temperature to the initial crystallization chamber.

9. The apparatus for fabricating a phase-change recording medium according to claim 8, wherein
said crystallization energy supply mechanism irradiates the recording layer with a single laser beam formed preferably of an array of laser sources extending in a radial direction of the phase-change recording medium, to apply the initial crystallization to the recording area of the recording layer.

10. The apparatus for fabricating a phase-change recording medium according to claim 8, wherein
said crystallization energy supply mechanism irradiates the recording layer with a plurality of laser beams to apply the initial crystallization to the recording area of the recording layer, the laser beams extending in radial directions of the phase-change recording medium and being separated from each other in the circumferential direction of the same.

11. An apparatus for fabricating a phase-change recording medium according to claim 8, further comprising a rotating mechanism for bearing and rotating the phase-change recording medium.

12. An apparatus for fabricating a phase-change recording medium according to claim 8, wherein said initial crystallization chamber includes a rotating mechanism for bearing and rotating the phase-change recording medium.

13. An apparatus for fabricating a phase change recording medium for depositing particles of phase-change recording material onto a substrate to form a coat of phase-change recording layer comprising:
a vacuum chamber filled with a sputtering gas, the substrate being disposed in the vacuum chamber;
a sputtering target for striking the substrate with sputtering particles of the phase-change recording material to form the phase-change recording layer, the sputtering particles being deposited on the substrate up to a pre-determined thickness; and
a crystallization energy supply mechanism for irradiating the sputtering particles with a laser beam having an energy necessary for initial crystallization after the coat of deposited sputtering particles reaches the predetermined thickness, wherein initialization of the irradiation is started during the course of depositing the sputtering particles, but does not begin until the coat of the phase-change recording layer reaches the predetermined thickness.

14. An apparatus for fabricating a phase-change recording medium according to claim 13, further comprising a rotating mechanism for bearing and rotating the phase-change recording medium.

15. An apparatus for fabricating a phase-change recording medium according to claim 13, wherein the sputtering gas is composed of Ar gas at a pressure not greater than approximately 120 mTorr.

16. An apparatus for fabricating a phase-change recording medium according to claim 13, wherein the phase-change recording layer is formed of a GeAsTe-, AgInAsTs-, or other type of recording layer material, or a metal alloy having properties equivalent to those of the phase-change recording layer material.

17. An apparatus for fabricating a phase-change recording medium according to claim 13, wherein the pre-determined thickness is greater than or equal to 5 nm.

18. An apparatus for fabricating a phase-change recording medium according to claim 13, wherein the crystallization energy supply mechanism irradiates the phase-change recording layer with a laser beam having an energy necessary for initial crystallization.

19. An apparatus for fabricating a phase-change recording medium according to claim 13, further comprising a transporting mechanism for transporting the phase-change recording medium having the just formed phase-change recording layer to an initial crystallization chamber under vacuum.

20. An apparatus for fabricating a phase-change recording medium according to claim 19, wherein the crystallization energy supply mechanism is disposed in said initial crystallization chamber and irradiates the phase-change recording layer with a laser beam having an energy necessary for initial crystallization.

21. An apparatus for fabricating a phase-change recording medium according to claim 20, wherein the crystallization energy supply mechanism irradiates the phase-change recording layer with a single laser beam extending in a radial direction of the phase-change recording medium to apply the initial crystallization to a recording area of the phase-change recording layer.

22. An apparatus for fabricating a phase-change recording medium according to claim 20, wherein the crystallization energy supply mechanism irradiates the phase-change recording layer with a plurality of laser beams to apply the initial crystallization to a recording area of the phase-change recording layer, the laser beams extending in radial directions of the phase-change recording medium and being separated from each other in the circumferential direction of the same.

23. An apparatus for fabricating a phase-change recording medium according to claim 13, wherein the sputtering particles struck out of the sputtering target are directly irradiated so that the sputtering particles are provided with energy necessary for initial crystallization.

24. A method for fabricating a phase-change recording medium for depositing particles of phase-change recording material onto a substrate to form a coat of phase-change recording layer, the method comprising the steps of:

loading a substrate into a vacuum chamber;

filling the vacuum chamber with a sputtering gas;

providing a sputtering target made of a GeAsTe- or AgInAsTs-type alloy or the like;

striking sputtering particles of a GeAsTe- or AgInAsTs-type alloy or the like out of said sputtering target with a cathode;

depositing the sputtering particles struck out of said sputtering target onto the substrate to form the phase-change recording layer;

transporting the phase-change recording medium having the just-formed phase-change recording layer at elevated temperature after depositing the sputtering particles from said vacuum chamber to an initial crystallization chamber which may be under vacuum; and irradiating the sputtering particles with a laser beam of a crystallization energy supply mechanism, the sputtering particles having energy necessary for initial crystallization of the sputtering particles, wherein initialization of irradiation occurs after the phase-change recording medium having the just-formed phase-change recording layer is transported at elevated temperature to the initial crystallization chamber.

25. The method for fabricating a phase-change recording medium according to claim 24, further comprising the step of rotating the phase-change recording medium prior to the step of depositing the sputtering particles onto the substrate to form the phase-change recording layer.

26. The method for fabricating a phase-change recording medium according to claim 24, wherein the step of irradiating the sputtering particles further comprises irradiating the recording layer with a single laser beam formed of an array of laser sources extending in a radial direction of the phase-change recording medium to apply the initial crystallization to the recording area of phase-change recording layer.

27. The method for fabricating a phase-change recording medium according to claim 24, wherein the step of irradiating the sputtering particles further comprises irradiating the recording layer with a plurality of laser beams to apply the initial crystallization to the recording area of phase-change recording layer, the laser beams f extending in radial directions of the phase-change recording medium and being separated from each other in the circumferential direction of the same.

* * * * *